United States Patent
Um et al.

(10) Patent No.: US 7,899,304 B2
(45) Date of Patent: Mar. 1, 2011

(54) METHOD OF RECORDING THUMBNAIL PICTURES ONTO A RECORDING MEDIUM

(75) Inventors: Soung Hyun Um, Anyang-si (KR);
Kang Soo Seo, Kyunggi-do (KR);
Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1603 days.

(21) Appl. No.: 10/341,402

(22) Filed: Jan. 14, 2003

(65) Prior Publication Data

US 2003/0138236 A1 Jul. 24, 2003

(30) Foreign Application Priority Data

Jan. 18, 2002 (KR) .............. 10-2002-0003096

(51) Int. Cl.
*H04N 9/80* (2006.01)
*H04N 5/783* (2006.01)

(52) U.S. Cl. ................................ 386/241; 386/344
(58) Field of Classification Search ............. 386/69–70, 386/85, 125–126, 45–46
See application file for complete search history.

(56) References Cited

U.S. PATENT DOCUMENTS

| | | | | |
|---|---|---|---|---|
| 5,440,401 A * | 8/1995 | Parulski et al. | ............. | 386/124 |
| 6,553,180 B1 * | 4/2003 | Kikuchi et al. | ............. | 386/95 |
| 6,868,192 B2 * | 3/2005 | Takiguchi | ............. | 382/299 |
| 7,213,028 B2 * | 5/2007 | Yoshida et al. | ............. | 707/830 |
| 7,487,175 B2 * | 2/2009 | Yoshida et al. | ............. | 1/1 |
| 7,836,109 B2 * | 11/2010 | Hamada | ............. | 707/828 |
| 2001/0005433 A1 * | 6/2001 | Takiguchi | ............. | 382/299 |
| 2002/0145702 A1 * | 10/2002 | Kato et al. | ............. | 352/1 |
| 2003/0147629 A1 * | 8/2003 | Kikuchi et al. | ............. | 386/69 |
| 2005/0025461 A1 * | 2/2005 | Kato et al. | ............. | 386/95 |

FOREIGN PATENT DOCUMENTS

| | | |
|---|---|---|
| EP | 0 998 147 A1 | 5/2000 |
| JP | 10-106233 | 4/1998 |
| JP | 2000-113641 | 4/2000 |
| JP | 2000-322873 | 11/2000 |
| JP | 2001-157155 A | 6/2001 |
| JP | 2001-325786 | 11/2001 |
| KR | 2000-0010056 A | 2/2000 |
| WO | WO 96/08014 | 3/1996 |
| WO | WO 01/82609 A1 | 11/2001 |
| WO | WO 02/067582 A1 | 8/2002 |

\* cited by examiner

*Primary Examiner*—Thai Tran
*Assistant Examiner*—Nigar Chowdhury
(74) *Attorney, Agent, or Firm*—Birch, Stewart, Kolasch & Birch, LLP

(57) ABSTRACT

The present invention relates to a method of recording thumbnail pictures for recorded still pictures onto a recording medium. The present method records onto a recording medium a thumbnail in a thumbnail management file that accommodates all thumbnails, wherein the thumbnail is associated with a still picture, a mark or a menu item, and writes link information to link the recorded thumbnail with an associated still picture, mark, or menu item. Through the recorded thumbnails in association with still pictures, marks, and/or menu items, a user is able to find easily a desired still picture or a still-picture section.

22 Claims, 7 Drawing Sheets

METHOD OF RECORDING THUMBNAIL PICTURES ONTO A RECORDING MEDIUM

BACKGROUND OF THE INVENTION

1. Field of the Invention

The present invention relates to a method of recording thumbnail pictures for recorded still pictures onto a recording medium.

2. Description of the Related Art

A disk-type recording medium such as a compact disk (CD) can store high-quality digital audio data permanently, so that it is very popular recording medium. Recently, a digital versatile disk (referred as 'DVD' hereinafter) has been developed as a new disk-type recording medium. A DVD can store much larger size than a CD, thus, high-quality moving picture or audio data are recorded on a DVD for much longer time. Therefore, a DVD will be used widely in the near future.

There are three types of a DVD, DVD-ROM for read-only, DVD-R for write-once, and DVD-RAM or DVD-R/W for rewritable. For a rewritable DVD, the standardization of data writing format is in progress.

Recently, a Digital Still Camera (DSC) being capable of storing a taken picture in digital data has been developed. Such a DSC usually has a memory chip of large storage capacity so that it can take high-quality pictures and store audio data associated with the stored pictures as well. In a DSC, the taken pictures are encoded in the format of JPEG, or TIFF while the audio data are done in the format of PCM, u-Law PCM, or IMA-ADPCM.

A DSC has a well-known file system called 'DCF' (Design rule for Camera File system) for recording still pictures and audio data. FIG. 1 shows an illustrative DCF. In the structure of DCF, a DCIM (Digital Camera IMages) directory exists under a root directory and many subdirectories may exist under the DCIM. Each subdirectory has 8-digit-long filename that is composed of three numeric digits and five character digits. The three numeric digits should be unique, for instance, one among 100~999, and the five character digits are arbitrarily chosen by a user. Because the three numeric digits are unique the subdirectories can be created up to 900.

A subdirectory, e.g., subdirectory '100ABCDE' of FIG. 1 can accommodate many data files of which filename is 8-digits long. The filename is composed of four numeric digits and four character digits. While the four character digits are chosen by a user the four numeric digits should be unique among data files if their attributes are different. The data files are still pictures and/or audio files, respectively. The still picture files have extension of 'JPG' or 'TIF' while the audio files encoded by PCM, u-Law PCM or IMA-ADPCM have extension of 'WAV'. The filenames of the data files can be same if their extensions are different. Therefore, when a picture file is to be dubbed with audio, a dubbed audio file can be linked with the picture file only if their filenames are made same.

By the way, a digital video recorder (DVR) records video and audio data in a file structure shown in FIG. 2. The file structure of FIG. 2 has a DVR directory under a root directory. The DVR directory includes a menu file 'menu.tdat', a mark file 'mark.tdat', and their index files 'menu.tidx' and 'mark.tidx'. The menu and the mark file have menu data and mark data respectively and the index files have search data to index menu and mark data in the menu and the mark file.

The 'DVR' directory is mandatory for motion picture recording of a DVR. The 'DVR' directory has directories 'PLAYLIST', 'CLIPINF', 'STREAM', and 'STILLINF'. The 'PLAYLIST' directory includes playlist files (*.rpls, *.vpls) containing motion-picture and still-picture playitems and title management information. The directory 'CLIPINF' includes clip information files (*.clpi) containing information on movie stream management and movie attribute and the directory 'STREAM' includes stream files (*.m2ts) containing actual motion-picture data stream packets. The directory 'STILLINF' includes still-picture management file (*.stli) containing management information for search and presentation control of the still pictures.

By the way, the aforementioned recording medium of very large capacity is able to store enormous still pictures, so that it is preferable to record thumbnails of recorded still pictures in order to find a desired still picture or a still picture section easily.

Various methods to accept thumbnails of still pictures in the known recording structures is being under discussion among several concerned companies, however, a final method is still pending.

SUMMARY OF THE INVENTION

It is an object of the present invention to provide several methods that record thumbnails of recorded still pictures onto a recording medium.

A method of recording a thumbnail picture onto a recording medium in accordance with the present invention is characterized in that it comprises the steps of: recording onto a recording medium a thumbnail in a thumbnail management file that accommodates all thumbnails, each being associated with a still picture, a mark or a menu item; and writing link information to link the recorded thumbnail with an associated still picture, mark, or menu item.

Another method of recording a thumbnail picture onto a recording medium in accordance with the present invention is characterized in that it comprises the steps of: recording onto a recording medium thumbnails in separate thumbnail files, each including one thumbnail and being associated with a still picture, a mark or a menu item; and writing information to indicate whether or not there is a thumbnail file associated with a still picture, mark, or menu item.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIG. 3 is a block diagram of a disk device which a method of recording thumbnails onto a rewritable recording medium in accordance with the present invention is embedded in;

DETAILED DESCRIPTION OF THE PREFFERRED EMBODIMENT

In order that the invention may be fully understood, a preferred embodiment thereof will now be described with reference to the accompanying drawings.

Figure 3:
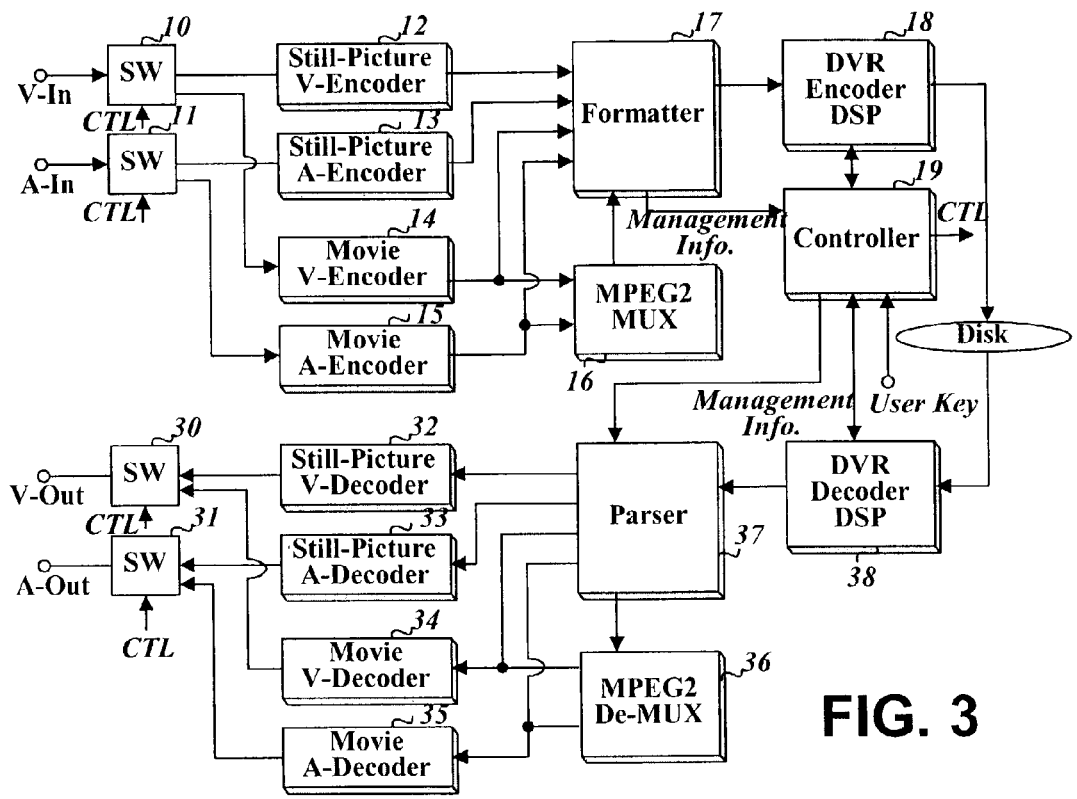
Figure 4:
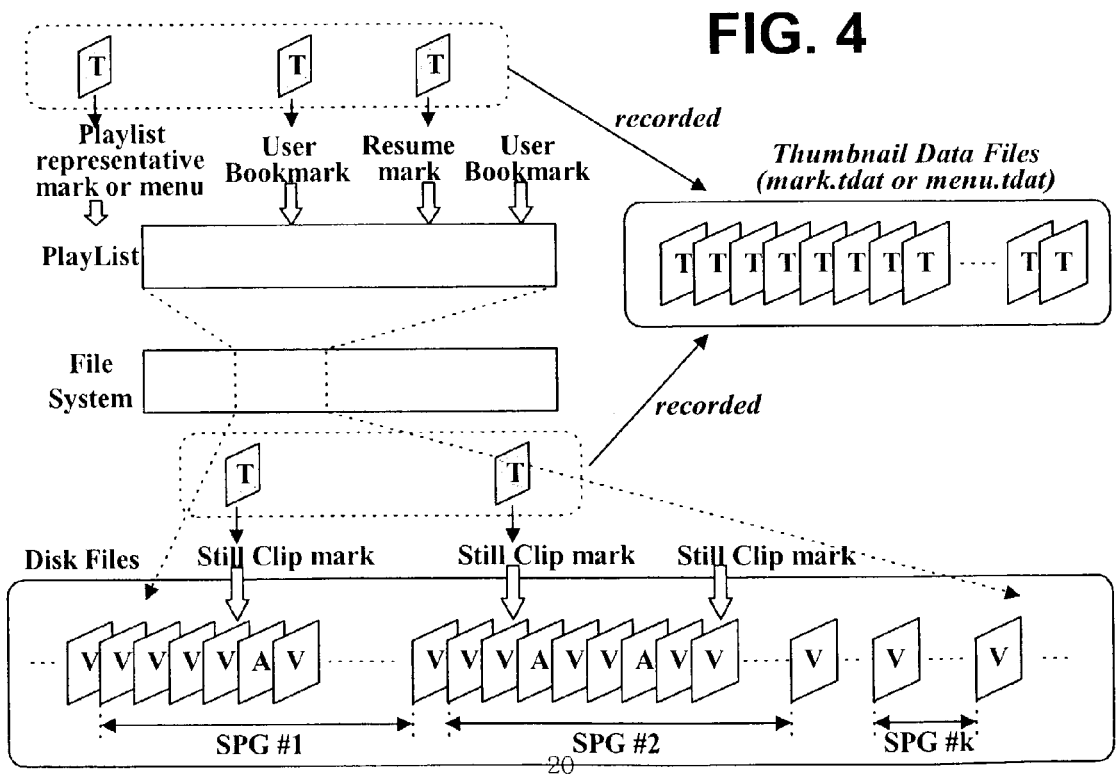
FIGS. 4 to 8 show schematic thumbnail recording processes and management information related with thumbnail recording in accordance with the first embodiment of the present invention.

FIG. 3 is a block diagram of a disk device which a method of recording thumbnail pictures onto a rewritable recording medium in accordance with the present invention is embedded in.

The disk device of FIG. 3, e.g., a DVR can record video/audio data and management information for searching and reproduction control onto a rewritable recording medium.

The disk device comprises, as shown in FIG. 3, an input processing module, an output processing module, and a controller 19 conducting overall system control. The input processing module is composed of two input switching units 10 and 11, a still picture video 12 and a still picture audio encoder 13, a movie video 14 and a movie audio encoder 15, an MPEG 2 muxer 16, a formatter 17, and a DVR encoding DSP 18 while the output processing module is composed of two output switching units 30 and 31, a still picture video 32 and a still picture audio decoder 33, a movie video 34 and a movie audio decoder 35, an MPEG 2 demuxer 36, a parser 37, and a DVR decoding DSP 38.

The two input switching units 10 and 11 selectively connect their input signals to the still picture video 12 and the still picture audio encoder 13 or the movie video 14 and the movie audio encoder 15 in response to a switching control 'CTL' of the controller 19. The still picture encoders 12 and 13 encode video data from the first switching unit 10 to JPEG or TIFF format and audio data from the second switching unit 11 to PCM, u-Law PCM, or IMA-ADPCM format, respectively as a DSC does.

The movie encoders 14 and 15 encode video data from the first switching unit 10 to MPEG 2 format and audio data from the second switching unit 11 to AC-3, MPEG 1 layer 2, or LPCM format, respectively. The MPEG 2 muxer 16 multiplexes the encoded video and audio data from the movie video 14 and the movie audio encoder 15 to produce MPEG 2 stream that is directed to the formatter 17.

In case that the encoded still picture video and audio data are inputted from the still picture encoders 12 and 13, the formatter 17 segments or groups input data to yield successive data units, adds necessary head information to each data unit, and transmits them sequentially to the DVR encoding DSP 18. The data unit has a size suitable for a recording unit area of a rewritable recording disk. Furthermore, the formatter 17 produces thumbnails of respective still pictures in accordance with a pre-specified thumbnail condition and it also produces management information for searching for and controlling reproduction of the re-sized still picture video and/or audio data, and the thumbnails. The produced management information is delivered to the controller 19.

In case that the encoded motion picture video and audio data are inputted from the movie encoders 14 and 15 and the MPEG 2 stream are from the MPEG 2 muxer 16 at the same time, the formatter 17 selects the encoded data or the MPEG 2 stream to segment or group the selected data to yield successive data units, adds necessary head information to each data unit, and transmits them sequentially to the DVR encoding DSP 18. The data unit has a size suitable for a recording unit area of a rewritable recording disk. The formatter 17 also produces management information for searching for and controlling reproduction of the re-sized motion picture video and/or audio data. The produced management information is delivered to the controller 19.

The DVD encoding DSP 18 constructs ECC (Error Correction Code) blocks with the successive data units having still or motion pictures, thumbnails and audio data and then modulates data of ECC blocks to corresponding recording waveforms that will form mark/space patterns on the surface of the rewritable recording disk. At this time, the controller 19 controls data recording of the DVR encoding DSP 18 in accordance with the data type being recorded. That is, the controller 19 determines recording location, file and directory to record data, and so on based data type being recorded. If needed, information entered by a user is used.

In addition, while or after video and/or audio data are recorded, the controller 19 records the management information received from the formatter 17 onto the rewritable recording disk through the DVR encoding DSP 18.

Below described are various thumbnail recording methods conducted by the above-explained recording processes.

FIGS. 4 to 8 show schematic thumbnail recording processes and management information related with thumbnail recording in accordance with the first embodiment of the present invention. In the first embodiment, a DVR uses a recording structure compatible with moving picture recording structure to record and manage thumbnails of still pictures.

A management file, e.g., a mark file 'mark.tdat' includes all created thumbnails and the index file 'mark.tidx' has location information of individual thumbnails included in the mark file. Furthermore, a mark field table allocated in a playlist includes index information of the location information written in the index file for the purpose of later rapid search.

Figure 1:
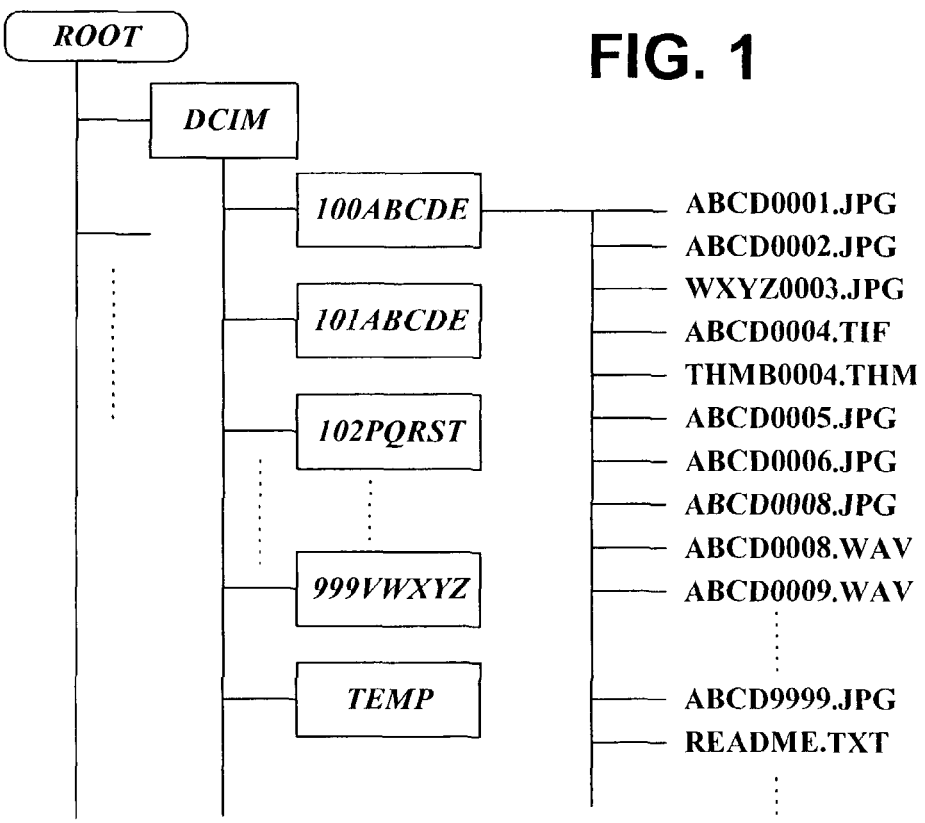
FIG. 1 shows an illustrative DCF (Design rule for Camera File system) adopted by a digital still camera.
Figure 2:
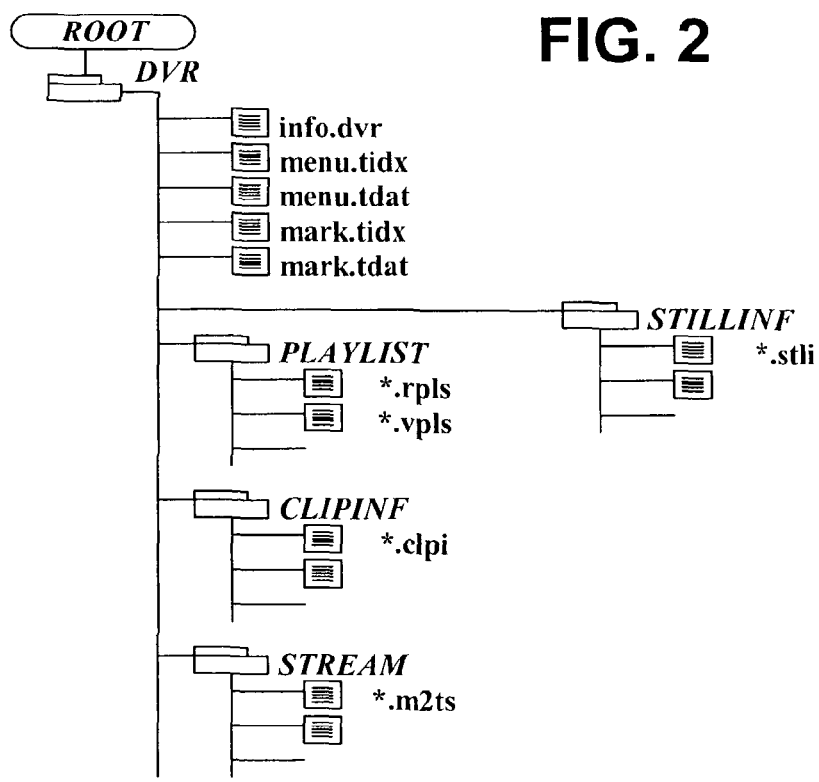
FIG. 2 shows an illustrative file system adopted by a digital video recorder.

The thumbnail 'T' is created for a representative mark or a menu item related with respective playlists included in the directory 'PLAYLIST' mentioned with reference to FIG. 2, for a user bookmark, and/or for a resume mark. The controller 19 stores the created thumbnails in the mark file 'mark.tdat' or the menu file 'menu.tdat' under the directory 'DVR'. Alternatively, the thumbnails may be created into separate files. Each thumbnail is created through size reduction of the formatter 17 from a still picture selected by a user.

A still clip mark is designated to a still picture among at least one still pictures or at least one still picture group (SPG) that is included in at least one data file, which is referred through a file system, covered by a playlist. The controller 19 commands the formatter 17 to make a thumbnail of a still picture pointed by every still clip mark, and then inserts the thumbnails made by the formatter 17 in the mark file 'mark.tdat' or in the menu file 'menu.tdat'.

Figure 5:
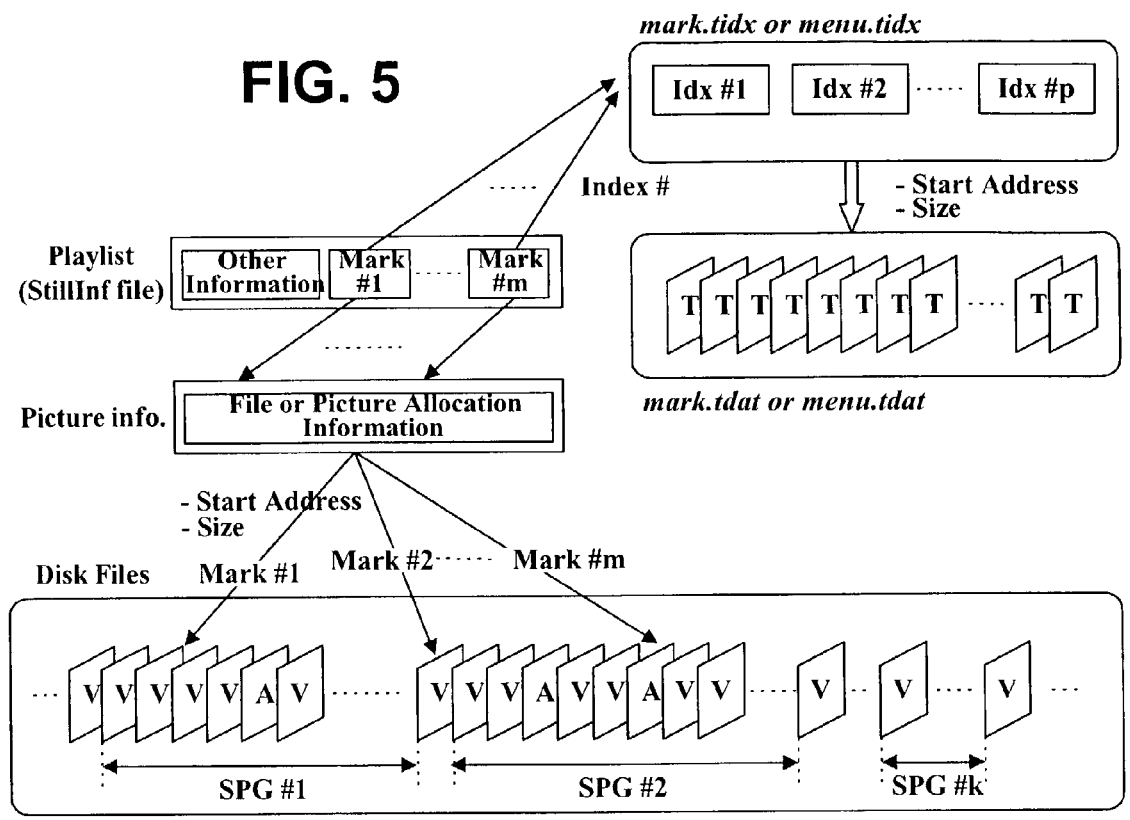

Furthermore, the controller 19 creates index information pointing to the thumbnail location entries and writes the index information in respective pieces of mark information 'marks #1 to #m' allocated in the playlist or in respective pieces of still clip mark information allocated in a still-picture information file (*.stli) under the directory 'STILLINF', as shown in FIG. 5. Each piece of the index information points each location entry 'Idx #1 . . . Idx #p' created in the index file 'mark.tidx' or 'menu.tidx' by the controller 19. And, each location entry includes start address and size of each thumbnail stored in the mark file 'mark.tdat' or in the menu file 'menu.tdat'.

The mark information 'marks #1 to #m' can also include location information pointing a allocation unit, which is allocated for a still picture whose thumbnail is created, having information of start address and size on the file system.

Figure 6:
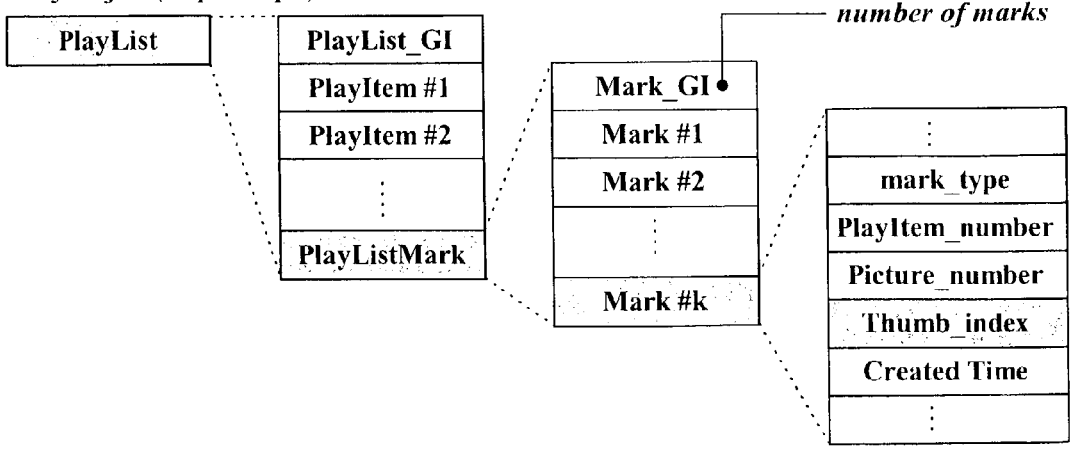

The playlist accommodates the aforementioned mark information in a mark field table 'PlayListMark' as shown in FIG. 6. The mark field table 'PlayListMark' is composed of mark general information 'Mark_GI' and plural pieces of mark information 'Marks #1 to #k'. The mark general information 'Mark_GI' includes the number of mark information and each piece of mark information consists of a mark type 'mark_type', an associated playitem number 'Playitem_number', an associated picture number 'Picture_number', a thumbnail index number 'Thumb_index' which is indirect link information to a thumbnail, and a mark-created time 'Created Time'.

Figure 7:
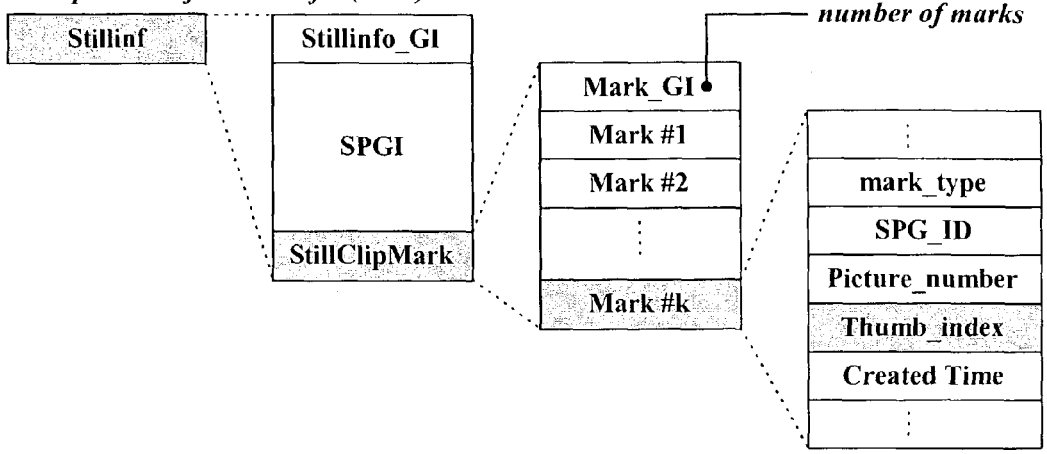

The still clip mark information related with still-picture groups can be accommodated in the still-picture information file (*.stli) structured as FIG. 7. The structure of FIG. 7 is composed of still-picture general information field 'Stillinfo_GI', still-picture group information field 'SPGI', and a still clip mark field table 'StillClipMark' which the still clip mark information is written in. The still clip mark field table 'StillClipMark' is composed of mark general information 'Mark_GI' and plural pieces of still clip mark information 'Marks #1 to #k'. The mark general information 'Mark_GI' includes the number of mark information and each piece of still clip mark information consists of a mark type 'mark_type', an identification of still-picture group 'SPG_ID', an associated picture number 'Picture_number', a thumbnail index number 'Thumb_index' which is indirect link information to a thumbnail, and a mark-created time 'Created Time'.

Figure 8:
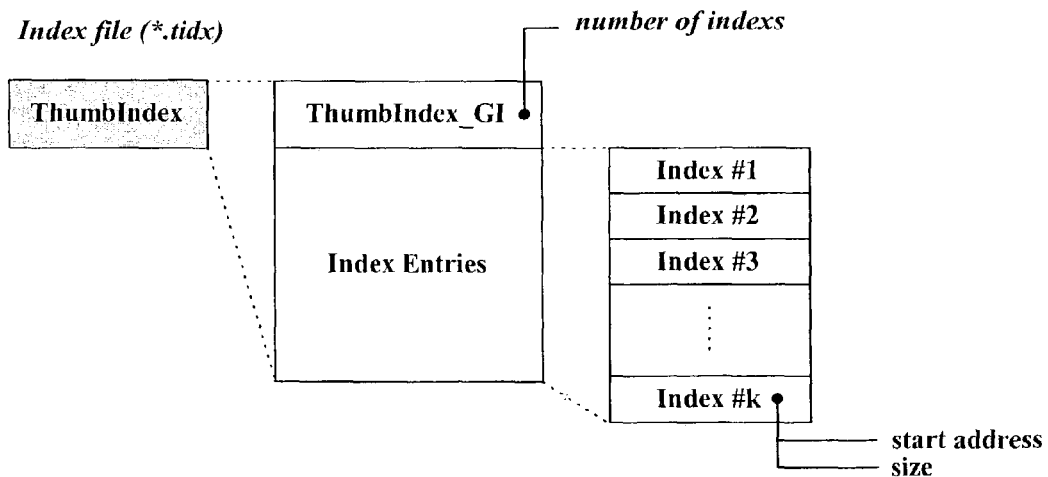

The index file (*.tidx) has thumbnail location information structured as FIG. 8. The thumbnail location information, which is link information directed to respective thumbnails, is composed of thumbnail index general information 'ThumbIndex_GI' and an index table that includes location entries 'Index #1 to #k'. The thumbnail index general information 'ThumbIndex_GI' includes the number of location entries 'Index #1 to #k' and each entry has start address and size information of an associated thumbnail.

Using the above-explained link information of FIGS. 6 to 8, thumbnails of playlist representative marks or menu items and thumbnails of user bookmarks or resume marks can be individually found from the mark or the menu file and then presented to a user.

In addition, an individual thumbnail linked with a picture that a still clip mark is on among pictures or SPGs can be also identified from the mark or the menu file with reference to the above-explained link information of FIGS. 6 to 8 and the identified thumbnail is then presented.

Figure 9:
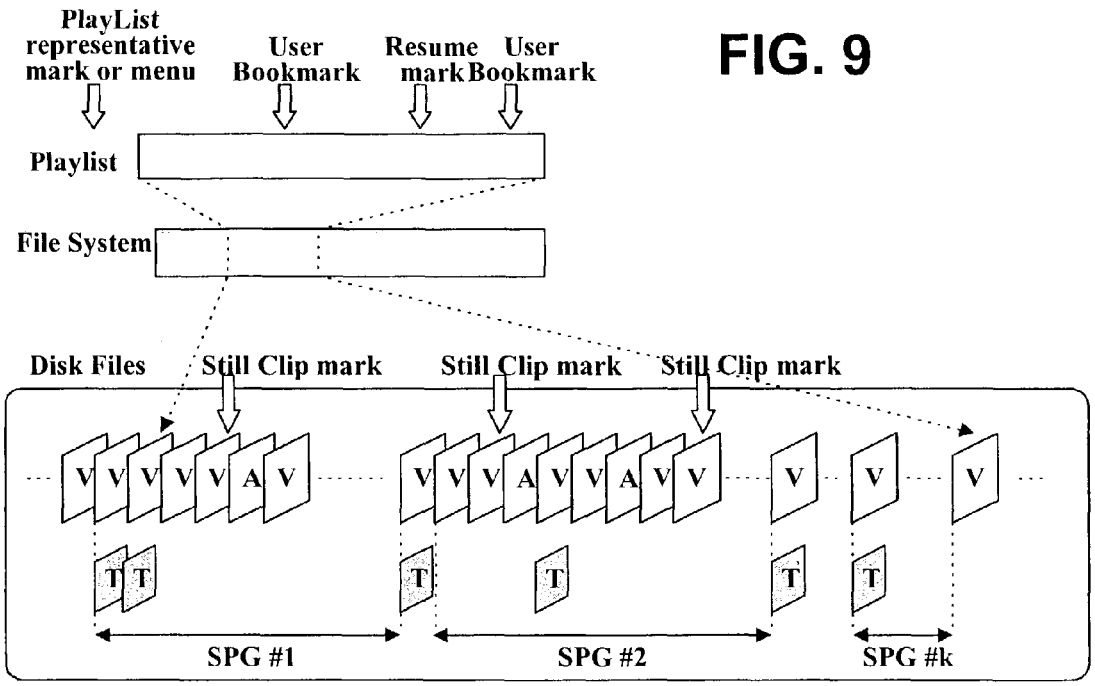
FIGS. 9 to 12 show schematic thumbnail recording processes and management information related with thumbnail recording in accordance with the second embodiment of the present invention.

FIGS. 9 to 12 show schematic thumbnail recording processes and management information related with thumbnail recording in accordance with the second embodiment of the present invention. In the second embodiment, a DVR uses a recording structure compatible with still picture recording structure of a DSC to record and manage thumbnails of still pictures. In this embodiment, a thumbnail file (*.THM) is created for each thumbnail and thumbnail files are not created in navigation data area of a recording medium as shown in FIG. 9.

Figure 10:
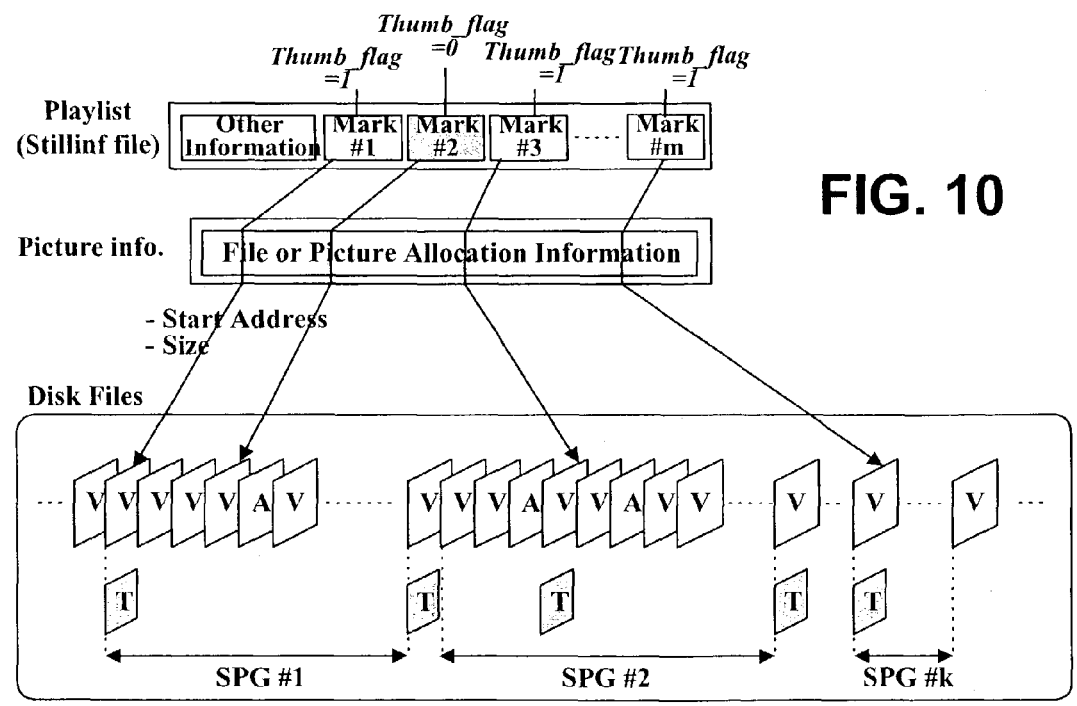

The mark information reserved in a playlist etc. includes, in connection with thumbnail, only a flag to indicative of presence or absence of a related thumbnail as shown in FIG. 10, instead of link information.

FIG. 9 shows that thumbnails 'T' of chosen still pictures among respective SPGs are recorded as general disk files (*.THM) the same as still pictures. FIG. 10 shows that a playlist or a still-picture information file has mark information with a flag 'Thumb_flag' that is '1' in case of presence of a related thumbnail and is '0' in case of absence of a related thumbnail.

Figure 11:
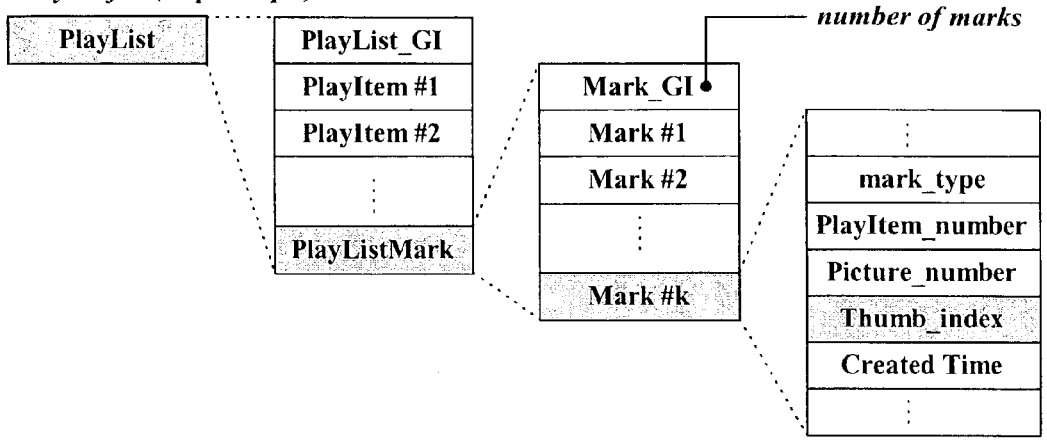

FIG. 11 is a playlist structured in accordance with the second embodiment of the present invention. The playlist of FIG. 11 includes a mark field table 'PlayListMark' that is composed of mark general information 'Mark_GI' and plural pieces of mark information 'Marks #1 to #k'. The mark general information 'Mark_GI' includes the number of mark information and each piece of mark information consists of a mark type 'mark_type', an associated playitem number 'Playitem_number', an associated picture number 'Picture_number', a thumbnail presence/absence flag 'Thumb_flag' which is indicative of presence or absence of a mark-corresponding thumbnail, and a mark-created time 'Created Time'.

The mark type is one among playlist representative mark, user bookmark, and resume mark, and the picture number can be replaced with file number, filename or entry number.

Figure 12:
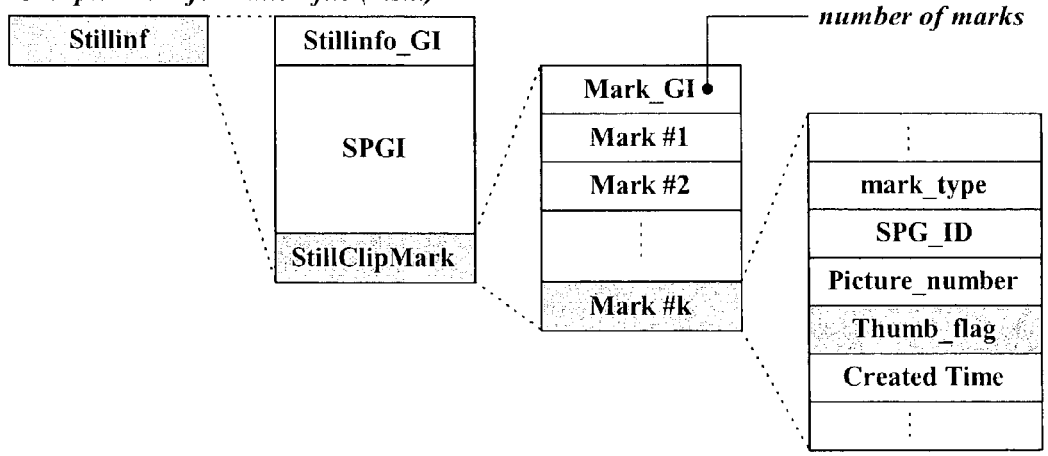
Figure 13:
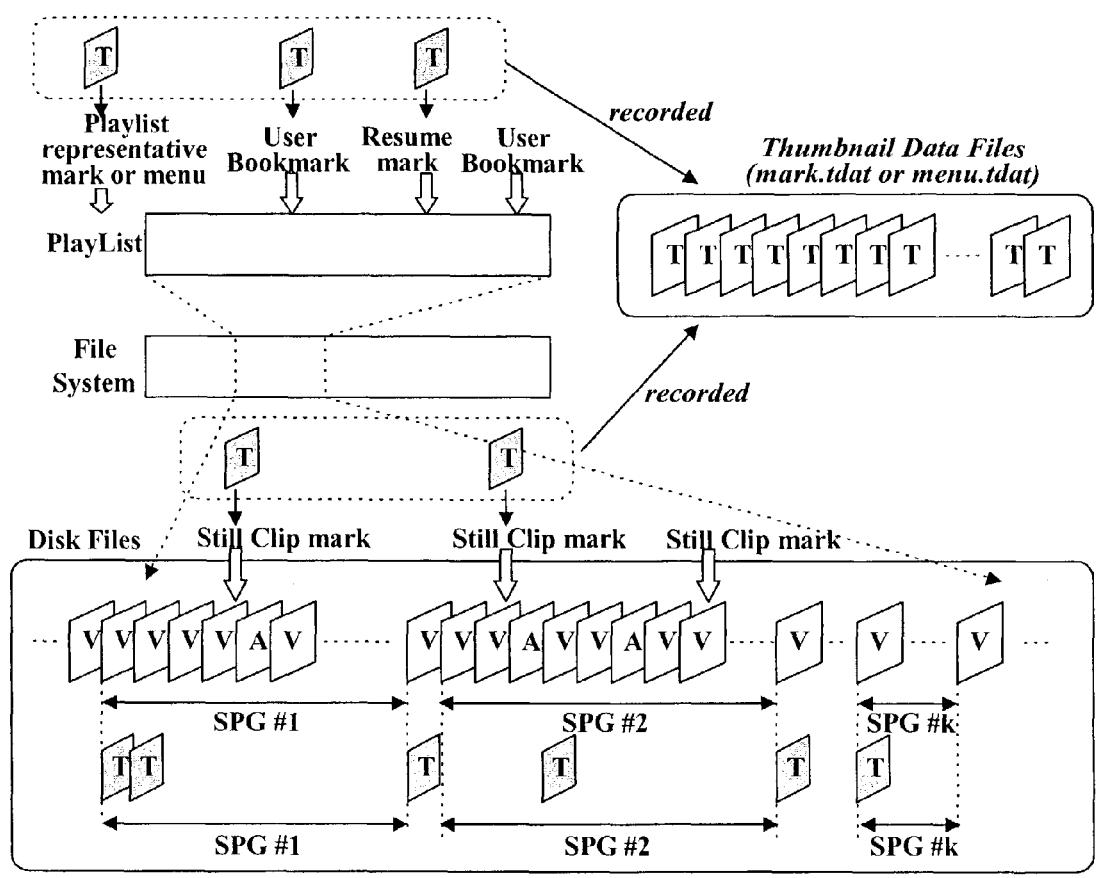
FIG. 13 shows a schematic thumbnail recording process in accordance with a combined embodiment of the first and the second.

The still clip mark information related with still-picture groups can be accommodated in the still-picture information file (*.stli) structured as FIG. 12. The structure of FIG. 12 is composed of still-picture general information field 'Stillinfo_GI', still-picture group information field 'SPGI', and a still clip mark field table 'StillClipMark' which the still clip mark information is written in. The still clip mark field table 'StillClipMark' is composed of mark general information 'Mark_GI' and plural pieces of mark information 'Marks #1 to #k'. The mark general information 'Mark_GI' includes the number of mark information and each piece of mark information consists of a mark type 'mark_type', an identification of still-picture group 'SPG_ID', an associated picture number 'Picture_number', a thumbnail presence/absence flag 'Thumb_flag' which is indicative of presence or absence of a mark-corresponding thumbnail, and a mark-created time 'Created Time' In the second embodiment where a single thumbnail is recorded in a single file as in a DSC, if the thumbnail presence/absence flag is set, a file with extension of 'THM' and the same filename with a picture file identified by the picture number is read through a file system and its content is presented as a thumbnail to a user.

The above explained first and second embodiments can be used together. That is, thumbnails related with pictures, marks, and/or menu items are recorded collectively in a single management file (mark.tdat or menu.tdat) and individually in separate data files at the same time in order that either might be used later.

Needless to say, the above-explained embodiments are applicable to a disk device structured differently from the disk device of FIG. 3.

The above-explained thumbnail recording method ensures a user to find easily a desired still picture or a still-picture section through viewing thumbnails recorded in connection with still pictures, marks, and/or menu items.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of recording a thumbnail picture onto a recording medium, the method comprising:
   (a) recording onto the recording medium a plurality of thumbnails in a thumbnail file, each of the plurality of thumbnails being associated with a corresponding one of a plurality of still pictures that are recorded in another file separately from the thumbnail file; and
   (b) writing an index file for each of the plurality of thumbnails and an information file for the plurality of still pictures, the index file and the information file being separated from the thumbnail file and the another file, the index file including index information for pointing to a corresponding one of the plurality of thumbnails and size information about a size of the corresponding thumbnail, the information file including the index information for pointing to a corresponding one of the plurality of thumbnails and an identifier to indicate a still picture group to which the still picture associated with the corresponding thumbnail belongs, wherein the thumbnail file corresponds to one of a mark file and menu file defined in a file system of a digital video recorder and used by the digital video recorder in recording and reproducing motion picture data.

2. The method of claim 1, wherein the index file includes a start address of the thumbnail recorded in the thumbnail file.

3. The method of claim 1, wherein the index information and the identifier are written in mark information included in the information file.

4. The method of claim 3, wherein the mark information further includes one of a mark type, a picture number, and a mark-created time.

5. A method of recording a thumbnail picture onto a recording medium, the method comprising:
   (a) recording onto the recording medium a plurality of thumbnails in a thumbnail file, each of the plurality of thumbnails being associated with a corresponding one of a plurality of still pictures that are recorded in another file separately from the thumbnail file; and
   (b) writing control information for a plurality of marks corresponding to the still pictures into an information file separated from the thumbnail file and the another file, the control information including, for each mark, a) a thumbnail flag to indicate whether or not one of the plurality of marks has an associated thumbnail in the thumbnail file, and b) an identifier to indicate a still picture group to which a still picture associated with the corresponding mark belongs.

6. The method of claim 5, wherein said step (b) writes said control information in a still-picture information file or a playlist that is defined as management information by a digital video recorder.

7. The method of claim 6, wherein said control information is written in mark information included in the playlist.

8. The method of claim 7, wherein the mark information includes one of a mark type, a playitem number, and a mark-created time.

9. The method of claim 6, wherein said control information is written in still clip mark information included in the still-picture information file.

10. The method of claim 9, wherein the still clip mark information includes one of a mark type, and a mark-created time.

11. A non-transitory computer-readable medium including recorded data that is read by a digital video recorder to reproduce the recorded data, the computer-readable medium comprising:
   a plurality of thumbnails in a thumbnail file, each of the plurality of thumbnails being associated with a corresponding one of a plurality of still pictures that are recorded in another file separately from the thumbnail file;
   an index file for each of the plurality of thumbnails, the index file including index information for pointing to a corresponding one of the plurality of thumbnails and size information about a size of the corresponding thumbnail; and
   an information file for the plurality of still pictures, the information file including the index information for pointing to a corresponding one of the plurality of thumbnails and an identifier to indicate a still picture group to which the still picture associated with the corresponding thumbnail belongs, wherein the index file and the information file are separated from the thumbnail file and the another file, and the thumbnail file corresponds to one of a mark file and menu file defined in a file system of a digital video recorder and used by the digital video recorder in recording and reproducing motion picture data.

12. A non-transitory computer-readable medium including recorded data that is read by a digital video recorder to reproduce the recorded data, the computer-readable medium comprising:
   a plurality of thumbnails in a thumbnail file, each of the plurality of thumbnails being associated with a corresponding one of a plurality of still pictures that are recorded in another file separately from the thumbnail file; and
   control information for a plurality of marks corresponding to the still pictures in an information file separated from the thumbnail file and the another file, the control information including, for each mark, a) a thumbnail flag to indicate whether or not one of the plurality of marks has an associated thumbnail in the thumbnail file, and b) an identifier to indicate a still picture group to which a still picture associated with the corresponding mark belongs.

13. The non-transitory computer-readable medium of claim 12, wherein said control information is included in a still-picture information file or a playlist that is defined as management information.

14. The non-transitory computer-readable medium of claim 13, wherein said control information is written in mark information included in the playlist.

15. The non-transitory computer-readable medium of claim 14, wherein the mark information includes one of a mark type, a playitem number, and a mark-created time.

16. The nom-transitory computer-readable medium of claim 13, wherein said control information is written in still clip mark information included in the still-picture information file.

17. The non-transitory computer-readable medium of claim 16, wherein the still clip mark information includes one of a mark type, and a mark-created time.

18. An apparatus for recording a thumbnail picture onto a recording medium, comprising:
   a controller configured to:
      (a) record onto the recording medium a plurality of thumbnails in a thumbnail file, each of the plurality of thumbnails being associated with a corresponding one of a plurality of still pictures that are recorded in another file separately from the thumbnail file, and
      (b) record an index file for each of the plurality of thumbnails and an information file for the plurality of still pictures, the index file and the information file being separated from the thumbnail file and the another file, the index file including index information for pointing to a corresponding one of the plurality of thumbnails and size information about a size of the corresponding thumbnail, the information file including the index information for pointing to a corresponding one of the plurality of thumbnails and an identifier to indicate a still picture group to which the still picture associated with the corresponding thumbnail belongs; and a pickup unit configured to record the thumbnail file, the index file and the information file onto the recording medium, according to a control of the controller, wherein the thumbnail file corresponds to one of a mark file and menu file defined in a file system of a digital video recorder and used by the digital video recorder in recording and reproducing motion picture data.

19. An apparatus for recording a thumbnail picture onto a recording medium, comprising:

a controller configured to
  (a) record onto the recording medium a plurality of thumbnails in a thumbnail file, each of the plurality of thumbnails being associated with a corresponding one of a plurality of still pictures that are recorded in another file separately from the thumbnail file, and
  (b) write control information for a plurality of marks corresponding to the still pictures into an information file separated from the thumbnail file and the another file, the control information including, for each mark,
    a) a thumbnail flag to indicate whether or not one of the plurality of marks has an associated thumbnail in the thumbnail file, and b) an identifier to indicate a still picture group to which a still picture associated with the corresponding mark belongs; and a pickup unit configured to record the thumbnails and the control information onto the recording medium, according to a control of the controller.

20. The apparatus of claim 19, wherein said controller is further configured to generate said control information included in a still-picture information file or a playlist that is defined as management information.

21. The apparatus of claim 20, wherein said controller is further configured to generate said control information included in mark information included in the playlist.

22. The apparatus of claim 13, wherein the mark information includes one of a mark type, a playitem number, and a mark-created time.

* * * * *